United States Patent
Bobbitt, III

[11] Patent Number: 5,937,500
[45] Date of Patent: Aug. 17, 1999

[54] METHOD FOR MAKING A STEERING COLUMN ASSEMBLY

[75] Inventor: John Thomas Bobbitt, III, Warwickshire, United Kingdom

[73] Assignee: The Torrington Company, Torrington, Conn.

[21] Appl. No.: 08/959,046

[22] Filed: Oct. 28, 1997

Related U.S. Application Data

[62] Division of application No. 08/609,008, Feb. 28, 1996, Pat. No. 5,718,131.

[30] Foreign Application Priority Data

Mar. 2, 1995 [GB] United Kingdom .................. 9504165

[51] Int. Cl.⁶ ...................................................... B23P 11/00
[52] U.S. Cl. .............................................................. 29/516
[58] Field of Search ............... 29/516, 517; 70/182–186, 70/252; 74/492; 403/282, 284, 275; 464/32, 89, 181, 182

[56] References Cited

U.S. PATENT DOCUMENTS

| | | |
|---|---|---|
| 1,251,987 | 1/1918 | McFarland . |
| 3,824,665 | 7/1974 | Saito . |
| 3,893,718 | 7/1975 | Powell .................................. 29/516 X |
| 4,304,147 | 12/1981 | Linnemeier et al. ...................... 74/492 |
| 4,738,154 | 4/1988 | Hancock ................................ 29/516 X |
| 4,750,380 | 6/1988 | Hoblingre et al. ........................ 74/556 |
| 4,854,141 | 8/1989 | Haldric et al. ............................. 70/182 |
| 5,235,734 | 8/1993 | DuRocher et al. .................... 29/516 X |

FOREIGN PATENT DOCUMENTS

| | | |
|---|---|---|
| 0 035 415 | 9/1981 | European Pat. Off. . |
| 0 129 522 | 12/1984 | European Pat. Off. . |
| 0 206 861 | 12/1986 | European Pat. Off. . |
| 216-651 | 4/1987 | European Pat. Off. . |
| 381-554 | 8/1990 | European Pat. Off. . |
| 3435-084 | 4/1986 | Germany . |
| 3629-639 | 3/1988 | Germany . |
| 59-73349 | 4/1984 | Japan . |
| 2 187 422 | 9/1987 | United Kingdom . |

*Primary Examiner*—S. Thomas Hughes
*Attorney, Agent, or Firm*—Robert F. Palermo

[57] ABSTRACT

A method for making a steering column locking assembly includes swaging a steering column tube and a steering column lock collar in such a manner that relative rotation between the two parts is resisted below a predetermined torque while relative rotation occurs at values of value above the predetermined value. A layer of plastics material may be provided between the two parts. Once the predetermined torque is overcome, then rotation between the two parts occurs, but ceases once the torque level drops below the predetermined level.

9 Claims, 1 Drawing Sheet

METHOD FOR MAKING A STEERING COLUMN ASSEMBLY

This is a Division of application Ser. No. 08/609,008 filed Feb. 28, 1996, now U.S. Pat. No. 5,718,131.

BACKGROUND OF THE INVENTION

This invention relates to a steering column locking assembly.

Vehicle steering columns incorporate devices to inhibit vehicle theft. Two known types incorporate a fixed lock bolt and a tolerance ring to hold a lock collar in position. One type has the lock collar on the steering column tube and the other type has the lock collar on a steering wheel hub. Both of these types require tight tolerances on the components in order to achieve the torque profiles required. In addition, in practice, one of the materials required needs to be extremely hard, requiring non-standard material.

The foregoing illustrates limitations known to exist in present steering column locking assemblies. Thus, it is apparent that it would be advantageous to provide an alternative directed to overcoming one or more of the limitations set forth above. Accordingly, a suitable alternative is provided including features more fully disclosed hereinafter.

SUMMARY OF THE INVENTION

In one aspect of the present invention, this is accomplished by providing a method for making a steering column lock assembly made according to the method of the invention comprising the steps of providing a cylindrical steering column tube; providing a hollow cylindrical lock collar inserting the steering column tube into the lock collar; reducing the diameter of an axially extending portion of the lock collar to a predetermined reduced diameter whereby relative rotation between the steering column tube and the lock collar is resisted below a predetermined torque value and relative rotation between the steering column tube and the lock collar is permitted above the predetermined torque value.

The foregoing and other aspects will become apparent from the following detailed description of the invention when considered in conjunction with the accompanying drawing figures.

BRIEF DESCRIPTION OF THE DRAWING FIGURES

FIG. 1 is a diagrammatic side view, partly in cross-section, of a steering column locking assembly, and FIG. 2 is a perspective view of a lock collar shown in FIG. 1 but prior to forming.

DETAILED DESCRIPTION

Figure 1:
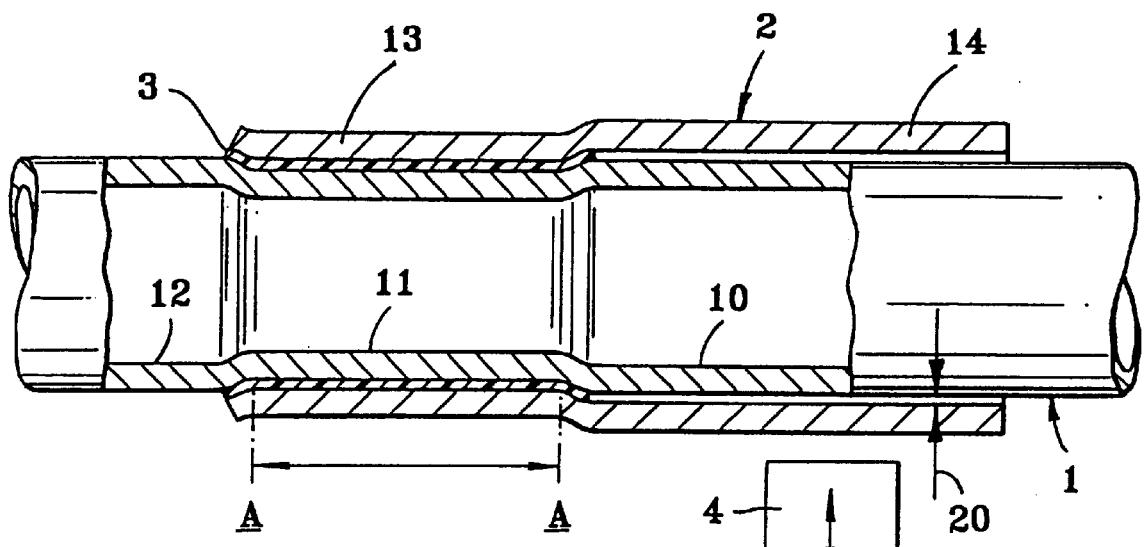
Figure 2:
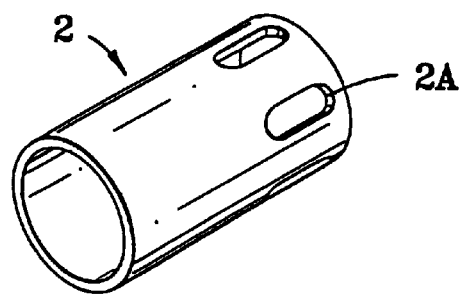

According to one aspect of the present invention, there is provided a method of making a steering column locking assembly comprising a first part and a second part, one of said parts being a steering column tube having an outer portion of circular section and the other of said parts being a steering column lock collar having a cylindrical inner portion fitting on said outer portion of said steering column, the method comprising swaging said first part onto said second part in such a manner that the two parts resist relative movement below a predetermined torque value and allow relative rotation at torque above said predetermined value.

Preferably, said first part is the steering column lock collar and the second part is the steering column tube.

The swaging may be such as to cause deformation of one or both of said parts.

A layer of plastics material may be provided between the two parts. The plastics material layer may be a separate layer and/or may be provided on the inside of the lock collar and/or on the outer portion of the steering column tube.

The drawing shows a cylindrical upper steering column tube 1 about which is fitted a cylindrical lock collar 2. Prior to fitting, the lock collar 2 is basically unformed and, once in place, is swaged into position onto a cylindrical outer portion of the steering column tube 1.

The lock collar 2 can be mechanically reduced to attach the lock collar to the steering column tube 1 by a Vailling process or with the use of a hydraulic press. A Vailling process is one in which a tube or shaft is formed by pushing it into a die, over a mandrel, or a combination of both. Swaging uses hammers to beat the metal into a different shape. The material changes that occur during these process are different and sometimes the processes can not be interchanged due to finished component material requirements. In general, Vailling hardens a material, and therefore, without annealing, can not work the material as much. Preferably, the lock collar 2 is swaged on the steering column tube 1. Also, preferably, the lock collar 2 is swaged on the steering column tube 1 as the tube 1 is being formed.

The swaging process is arranged such that a certain predetermined amount of torque resistance is provided between the tube 1 and lock collar 2, the intention being that only a finite amount of torque is accepted and then rotation between the two parts occurs at any value above that. Once the torque load drops below a critical predetermined level, the lock collar 2 must once again transmit torque from the tube 1. It is the intention that this relative movement can occur several times without significantly changing the critical torque value.

The swaging also has the effect of maintaining the relative axial position of the lock collar 2 at all times, even during a crash. The zone A—A indicates the swaging zone. The steering column tube 1 is divided into three axially extending portions 10, 11, 12 and the locking collar 2 is divided into two axially extending portions 13, 14. The diameter of the steering column tube first and third axially spaced portions 10, 12 is greater than the diameter of the steering column tube second axially spaced portion 11. The lock collar first axially spaced portion 13 is positioned about the steering column tube second axially spaced portion 11 and is formed to a reduced diameter, such that the diameter of the steering column tube first axially spaced portion is greater than the inner diameter of the lock collar first axially spaced portion 13 after the lock collar first axially spaced portion is formed to grip the steering column tube second axially spaced portion 11. The inner diameter of the lock collar second axially spaced portion 14 can be greater than the outer diameter of the steering column first axially spaced portion 10 creating a clearance 20 between the lock collar second axially spaced portion 14 and the steering column first axially spaced portion 10.

If desired, an antifriction material 3 can be included and could, for example, be a plastics coating on the collar 2 or on the tube 1. Alternatively, or in addition, the material 3 could be in the form of a plastics tube which is also swaged between the tube 1 and collar 2.

The amount of torque required to make the lock collar 2 slip can be adjusted by varying the length of the swaged zone, the amount of force used in the swaging process or the amount and type of antifriction material, or any combination thereof.

The lock collar 2 has a number of circumferentially spaced slots 2A any one of which can be engaged by a lock pawl 4 to lock the steering column and wheel.

Having described the invention, what is claimed is:

1. A method for forming a steering column lock assembly, comprising the steps of:

providing a hollow cylindrical lock collar, having at least first and second axially spaced portions, said second axially spaced portion having at least one axially extending lock slot;

providing a cylindrical steering column tube, having at least first, second and third axially spaced portions, the second axially spaced portion being between the first and third axially spaced portions;

reducing the diameter of the second axially spaced portion of the steering column tube to a diameter less than the diameter of the first and third axially spaced portions thereof;

inserting the steering column tube into the lock collar until the first axially spaced portion of said lock collar surrounds the second axially spaced portion of said steering column tube; and reducing the diameter of said first axially spaced portion of the lock collar to a predetermined reduced diameter, without reducing the diameter of the second axially spaced portion of said lock collar, such that said lock collar firmly grips said steering column tube and whereby relative rotation between the steering column tube and the lock collar is resisted below a predetermined torque value and relative rotation between the steering column tube and the lock collar is permitted above the predetermined torque value.

2. The method according to claim 1, wherein the step of reducing the diameter of said first axially spaced portion of the lock collar is performed by swaging.

3. The method according to claim 1, wherein the step of reducing the diameter of said first axially spaced portion of the lock collar is performed by vailling.

4. The method according to claim 1, wherein the step of reducing the diameter of said first axially spaced portion of the lock collar is performed by hydraulic pressing.

5. The method according to claim 1, comprising the further step of:

introducing a layer of plastics material between the lock collar and the steering column tube prior to the step of reducing the diameter of said first axially spaced portion of the lock collar.

6. The method according to claim 1, wherein the steps of reducing the diameter of the first axially spaced portion of the lock collar and reducing the diameter of the second axially spaced portion of the steering column tube are accomplished simultaneously.

7. A method for forming a steering column lock assembly comprising the steps of:

providing a hollow cylindrical lock collar having first and second axially spaced portions, said second axially spaced portion having having at least one axially extending lock slot;

providing a cylindrical steering column tube;

positioning a portion of the steering column tube to lie within the first axially spaced portion of the lock collar; and reducing the diameter of said first axially spaced portion of the lock collar, without reducing the diameter of the second axially spaced portion of the lock collar, simultaneously with forming the portion of the steering column tube which lies within the first axially extending portion of the lock collar, to reduce that portion of said steering column tube to a smaller diameter than that of portions of the steering column tube adjacent thereto.

8. The method of claim 7, wherein the step of reducing the diameter of said first axially spaced portion of the lock collar is performed by swaging.

9. The method according to claim 7, comprising the further step of:

inserting a layer of plastics material between said lock collar and said steering column tube prior to the step of reducing the diameter of said first axially spaced portion of said lock collar.

* * * * *